US 7,418,717 B1

(12) United States Patent
Dolske et al.

(10) Patent No.: US 7,418,717 B1
(45) Date of Patent: Aug. 26, 2008

(54) SMART CARD FRAMEWORK

(75) Inventors: Justin Dolske, Pickerington, OH (US); Tomoko Fukuzawa, Menlo Park, CA (US); Paul Sangster, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 914 days.

(21) Appl. No.: 10/678,472

(22) Filed: Oct. 3, 2003

(51) Int. Cl.
*G06F 9/54* (2006.01)
*G06F 17/60* (2006.01)

(52) U.S. Cl. .................................. 719/328; 235/379
(58) Field of Classification Search ................. 719/328; 235/379
See application file for complete search history.

(56) References Cited

U.S. PATENT DOCUMENTS

| | | | |
|---|---|---|---|
| 5,475,756 A | 12/1995 | Merritt | |
| 6,016,476 A * | 1/2000 | Maes et al. | 705/1 |
| 6,018,717 A * | 1/2000 | Lee et al. | 705/13 |
| 6,061,790 A | 5/2000 | Bodnar | |
| 6,094,485 A | 7/2000 | Weinstein et al. | |
| 6,230,148 B1 | 5/2001 | Pare, Jr. et al. | |
| 6,367,009 B1 | 4/2002 | Davis et al. | |
| 6,446,206 B1 | 9/2002 | Feldbaum | |
| 6,686,908 B1 * | 2/2004 | Kobayashi | 345/173 |
| 2003/0019927 A1 * | 1/2003 | Lindgren et al. | 235/382 |
| 2003/0191713 A1 * | 10/2003 | Yap et al. | 705/41 |

OTHER PUBLICATIONS

"OpenCard and PC/SC—Two New Industry Initiatives for Smart Cards," pp. 1-13.
IBM, "OpenCard Framework General Information Web Document," Second Edition, Oct. 1998, 24 pages.
Matthias Kaiserswerth, IBM, "The OpenCard Framework and PC/SC," Mar. 9, 1998, Research Report, 6 pages.
Bull CP8, et al., "Interoperability Specification for ICCs and Personal Computer Systems, Part 1. Introduction and Architecture Overview," Dec. 1997, 29 pages.

* cited by examiner

*Primary Examiner*—Meng-Ai An
*Assistant Examiner*—Abdou K Seye
(74) *Attorney, Agent, or Firm*—Hickman Palermo Truong & Becker LLP

(57) ABSTRACT

A mechanism is disclosed for allowing an application to perform specified operations in response to occurrences of a specified event relative to a specified Smart Card-accessing device. A customized API is exposed to the application. The application invokes an "addEventListener" method of the API. The invocation of the method specifies, as parameters of the method, at least a Smart Card-accessing device, a type of event, and a function. The server computer executing the application detects the invocation of the "addEventListener" method. In response to detecting the invocation, the server determines the type of the event specified by the invocation, and starts a mechanism that executes the specified function each time that an event of the specified type occurs relative to the specified Smart Card-accessing device. Consequently, the application does not need to be programmed to poll the specified Smart Card-accessing device at specific times during the application's execution.

22 Claims, 7 Drawing Sheets

SMART CARD FRAMEWORK

BACKGROUND

In its usual form, a Smart Card is a plastic card that contains an integrated circuit that may be accessed by a Smart Card-accessing device. Smart Card standards are provided in the International Organization for Standardization (ISO) Standard 7816. Smart Cards are useful for storing information concerning the Smart Card's owner. For example, a Smart Card may carry information about the Smart Card's owner's identity. Smart Card-accessing devices may retrieve and update the information stored by the Smart Card.

By inserting a Smart Card into a Smart Card-accessing device that is connected to a computer, the Smart Card's owner can provide information to the computer. Typically, such a computer executes an operating system and one or more applications that send information to and receive information from the Smart Card by invoking methods of an application programming interface ("API") that the operating system exposes to the applications.

Different APIs comprise different methods for communicating with Smart Cards. Two different APIs that provide methods for communicating with Smart Cards are the Open Card Framework ("OCF") API and the PC/SC API.

Sometimes multiple Smart Card-accessing devices are connected to the same computer, which under such circumstances typically is called a server computer. Each of a plurality of users may concurrently access the server computer through his own separate user session. If one user instructs an application to access a Smart Card-accessing device that contains another user's Smart Card, then the former user may be able to read information from and write information to the latter user's Smart Card.

SUMMARY

In accordance with one embodiment of the present invention, there is provided a mechanism for allowing an application to perform specified operations at the time of an occurrence of a specified event relative to a specified Smart Card-accessing device, even though the specified event may occur at any time during the application's execution. Additionally, in accordance with one embodiment of the present invention, there is provided a mechanism for preventing a user of a user session from causing an application to access a Smart Card-accessing device that is not associated with that user session.

In one embodiment, to allow an application to perform specified operations at the time of an occurrence of a specified event relative to a specified Smart Card-accessing device, a customized API is exposed to the application. The API comprises a plurality of methods that are implemented in one or more libraries. In one embodiment, the application invokes an "addEventListener" method of the API. The invocation of the "addEventListener" method specifies, as parameters of the method, at least a Smart Card-accessing device, a type of event, and a function.

The server computer executing the application detects the invocation of the "addEventListener" method. In response to detecting the invocation, the server computer determines the type of the event specified by the invocation. The server computer starts a mechanism, such as a thread, that executes the specified function each time that an event of the specified type occurs relative to the specified Smart Card-accessing device.

As a result, the application does not need to be programmed to poll the specified Smart Card-accessing device at specific times during the application's execution. The mechanism will execute the specified function in response to an occurrence of an event of the specified type regardless of the time at which the event occurs during the application's execution. This eliminates the possibility that an occurrence of the event will be missed while the application is busy performing other tasks, and simplifies the application code, making the application programmer's job easier.

As another result, the application can be programmed to respond to events that pertain to Smart Card-accessing devices as entities separate from Smart Cards. Therefore, an application can be programmed to respond to an event that occurs relative to a specified Smart Card-accessing device regardless of whether a Smart Card is present in the Smart Card-accessing device, and regardless of which Smart Card is present in the Smart-Card accessing device. This broadens the application's functionality.

Furthermore, in one embodiment, to prevent a user session from causing an application to access a Smart Card-accessing device that is not associated with that user session, the server computer associates each separate user session with a separate Smart Card-accessing device. In response to receiving a request to perform an operation relative to a particular Smart Card-accessing device, the server computer determines whether the particular user session in which the request was received is associated with the particular Smart Card-accessing device. If the server computer determines that the particular user session is not associated with the particular Smart Card-accessing device, then the server computer does not allow the operation to be performed.

As a result, a user of one Smart Card-accessing device is prevented from reading information from or writing information to Smart Cards that are present in other Smart Card-accessing devices, which may contain other users' Smart Cards.

DETAILED DESCRIPTION OF EMBODIMENT(S)

System Overview

Figure 1:
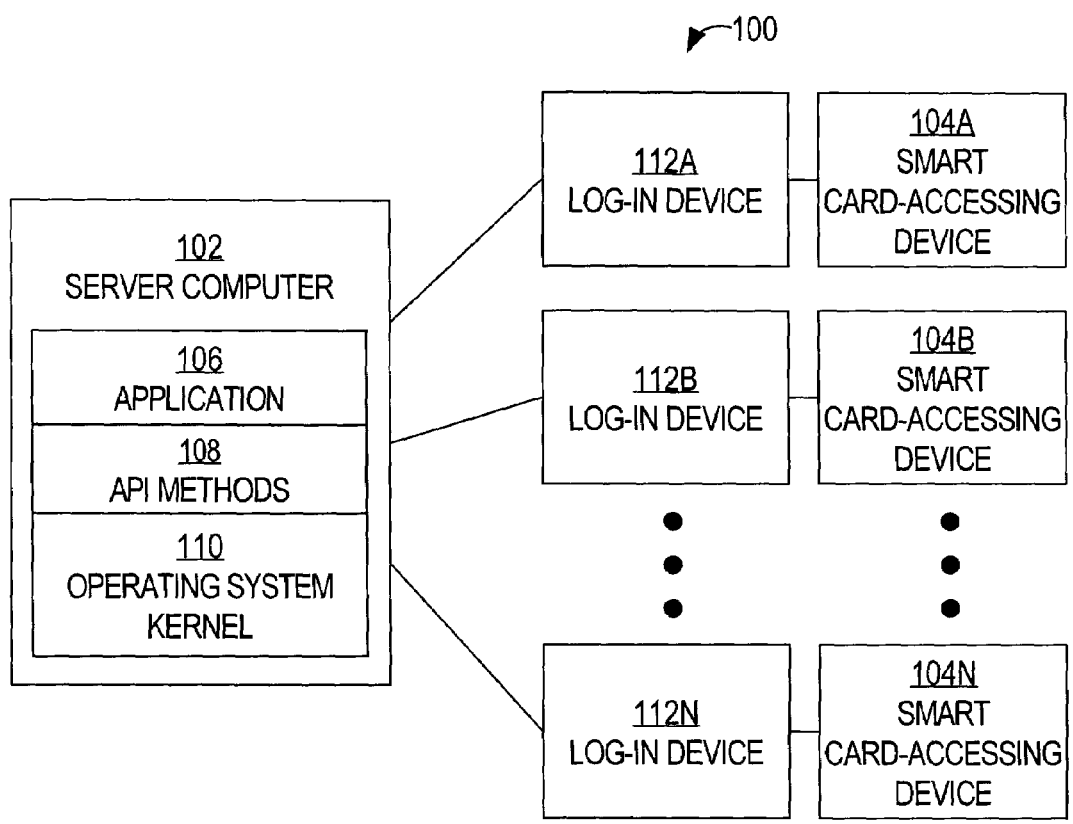
FIG. 1 is a functional block diagram of a computing system in which one embodiment of the present invention may be implemented.

With reference to FIG. 1, there is shown a functional block diagram of a sample computing system 100 in which one embodiment of the present invention may be implemented. As shown, system 100 comprises a server computer 102 coupled to log-in devices 112A-N. As used herein, a log-in device is any mechanism through which a user can log-in to a server computer. Although FIG. 1 shows log-in devices 112A-N coupled directly to server computer 102, it should be noted that log-in devices 112A-N may be coupled communicatively to server computer 102 through one or more networks, such as LANs, WANs, and/or the Internet, and/or through one or more wired/wireless connections.

Each of log-in devices 112A-N may comprise a separate set of user input devices such as a mouse and a keyboard, through which user input may be received and transmitted to server computer 102. Each of log-in devices 112A-N also may comprise a separate monitor through which information received from server computer 102 may be displayed.

System 100 further comprises Smart Card-accessing devices 104A-N. Each of Smart Card-accessing devices 104A-N is coupled with a log-in device. A Smart Card-accessing device may be separate from its associated log-in device, or a Smart Card-accessing device may be part of a single physical unit that also comprises the Smart Card-accessing devices' associated log-in device.

Smart Card-accessing devices 104A-N are capable of reading information from and/or writing information to Smart Cards that interface with Smart Card-accessing devices 104A-N. Typically, a Smart Card interfaces with a Smart Card-accessing device through the insertion of the Smart Card into a slot exposed by the Smart Card-accessing device.

In one embodiment, each Smart Card-accessing device may be a stand-alone computer with a central processing unit ("CPU"), memory (volatile and/or non-volatile), user interface devices and output devices. Further embodiments could include a range of devices between a general-purpose computer and a specifically designed Smart Card interface device. These could include Sun Microsystems SunRay clients, Axalto Reflex readers, GemPlus GemConnect terminals, CardCom IC card terminals, Innovonics PC Pay devices, SCM Microsystems Smart Card readers, VeriFone Omni portable wireless terminals, etc.

Server computer 102 executes an operating system kernel 110. Typically distributed with operating system kernel 110 are API methods 108. API methods 108 may be implemented in any of a variety of programming languages, such as C, C++, Java, Perl, and BASIC. For example, when API methods 108 are implemented in C, then API methods 108 may be specified as functions in one or more dynamic link libraries ("DLLs"), shared objects, or other libraries. For another example, when API methods 108 are implemented in Java, then API methods 108 may be specified as methods of one or more classes in one or more packages.

Server computer 102 also executes application 106. Like API methods 108, application 106 may be implemented in any of a variety of programming languages, such as C, C++, Java, Perl, and BASIC. For example, if API methods 108 are implemented in C, then application 106 may comprise invocations of functions implemented in a DLL. For another example, if API methods 108 are implemented in Java, then application 106 may comprise invocations of methods of objects that are instantiated from classes specified in a package.

Application 106 is programmed to invoke one or more of API methods 108 according to a specified interface. Thus, the interface is exposed to application 106. When application 106 invokes one of API methods 108, server computer 102 detects the invocation of that method. The invocation of such a method may involve application 106 passing specified parameters to the method. When server computer 102 detects the invocation of such a method, server computer 102 executes the instructions that are specified by the method.

Session-Specific Device Access Control

A user can log-in to server computer 102 through one of log-in devices 112A-N that is associated with one or more of Smart Card-accessing devices 104A-N. Each Smart Card-accessing device is associated with the log-in device to which that Smart Card-device is coupled. A mechanism of server computer 102 maintains a table of associations between log-in devices and associated Smart Card-accessing devices.

When a user logs in to server computer 102 through a particular log-in device, a particular user session is established through the particular log-in device. Server computer 102 associates the particular user session with the particular log-in device through which the particular user session was established. Then, based on the table of associations between log-in devices and Smart Card-accessing devices, server computer 102 determines which of Smart Card-accessing devices 104A-N is associated with the particular log-in device. A mechanism executing on server computer 102 creates an association between the particular user session and the one or more Smart Card-accessing devices that are associated with the particular log-in device.

According to one embodiment, when a request to access a particular Smart Card-accessing device is received through a particular user session, a mechanism executing on server computer 102 determines whether the particular user session is associated with the particular Smart Card-accessing device, and fulfils the request only if the particular user session is associated with the particular Smart Card-accessing device. Similarly, according to one embodiment, when a request to list Smart Card-accessing devices is received through a particular user session, a mechanism executing on server computer 102 determines which of Smart Card-accessing devices 104A-N are associated with the particular user session, and lists only those Smart Card-accessing devices that are associated with the particular user session.

Device-Specific Event Listeners

According to one embodiment, API methods 108 comprise an "addEventListener" method. The invocation of the "addEventListener" method specifies, as parameters of the method, one of Smart Card-accessing devices 104A-N, a type of event, and a function. For example, the function may be specified as a pointer to a particular function. In one embodiment, the types of events include a "device reset" event, a "card inserted" event, a "card removed" event, a "device closed" event, a "communication error" event, a "card present" event, and a "card absent" event. One or more types of events may be specified in a single invocation of the "addEventListener" method.

The "device reset" event occurs relative to a particular Smart Card-accessing device whenever the particular Smart Card-accessing device receives a command to reset the particular Smart Card-accessing device.

The "card inserted" event occurs relative to a particular Smart Card-accessing device whenever a Smart Card is inserted into the particular Smart Card-accessing device.

The "card removed" event occurs relative to a particular Smart Card-accessing device whenever a Smart Card is removed from the particular Smart Card-accessing device.

The "device closed" event occurs relative to a particular Smart Card-accessing device in response to the particular Smart Card-accessing device receiving a command to close the particular Smart Card-accessing device. Typically, the particular Smart Card-accessing device does not receive commands after closing in response to a command to close the particular Smart Card-accessing device.

The "communication error" event occurs relative to a particular Smart Card-accessing device in response to a mechanism executing on server computer 102 detecting a loss of communication between server computer 102 and the particular Smart Card-accessing device. For example, the "communication error" event may occur relative to a particular Smart Card-accessing device if a specified period of time has passed since the particular Smart Card-accessing device responded to a signal from server computer 102, or if the particular Smart Card-accessing device has not responded to a specified number of signals from server computer 102.

The "card present" and "card absent" events are generated in response to the starting of an event listener, and indicate whether a card is currently present in a specified Smart Card-accessing device. The "card present" and "card absent" events are generated once for each separate event listener. Once a "card present" or "card absent" event has been generated for a particular event listener, that event is not generated for that particular event listener again.

In one embodiment, in response to detecting an invocation, by application 106, of the "addEventListener" method, server computer 102 starts a mechanism (an "event listener"), such as a thread, that executes the specified function each time that an event of the specified type occurs relative to the specified Smart Card-accessing device. Through multiple invocations of the "addEventListener" method, multiple event listeners may be started. Each event listener may specify a different Smart Card-accessing device, one or more different events, and/or a different function than those specified by any other event listener. Thus, multiple event listeners, specifying different events and functions, may be started relative to the same Smart Card-accessing device. According to one embodiment, a particular event listener executes until the particular event listener is stopped through the invocation of a "removeEventListener" method as described below. Thus, a particular event listener may execute a specified function multiple times in response to multiple occurrences of a specified event.

According to one embodiment, each event listener indicates the state of the specified Smart Card-accessing device in response to that event listener being started. Thus, in one embodiment, when application 106 starts an event listener relative to a specified Smart Card-accessing device, the event listener indicates, once, to application 106, whether a Smart Card currently is present in the specified Smart Card-accessing device. The state of a Smart Card-accessing device may be indicated through the generation of an event (i.e., "card present" or "card absent") that specifies the state of the Smart Card-accessing device.

According to one embodiment, API methods 108 further comprise a "removeEventListener" method. The invocation of the "removeEventListener" method specifies, as parameters of the method, one of Smart Card-accessing devices 104A-N, and a function. In one embodiment, in response to detecting an invocation, by application 106, of the "removeEventListener" method, server computer 102 stops the event listener that corresponds to the specified function and the specified Smart Card-accessing device. Other event listeners that may be executing are not stopped. Therefore, event listeners that execute functions other than the specified function are not stopped, even if those event listeners also correspond to the specified Smart Card-accessing device. Furthermore, event listeners that correspond to Smart Card-accessing devices other than the specified Smart Card-accessing device are not stopped, even if those event listeners also execute the specified function. Thus, in one embodiment, only specified event listeners are stopped.

Device-Specific Device-State-Dependent Waiting

According to one embodiment, API methods 108 comprise a "waitForCardPresent" method. The invocation of the "waitForCardPresent" method specifies, as a parameter of the method, one of Smart Card-accessing devices 104A-N. In one embodiment, the invocation further specifies, as a parameter of the method, an amount of time. For example, the amount of time may be specified as a number that represents a number of seconds.

In one embodiment, in response to detecting an invocation, by application 106, of the "waitForCardPresent" method, server computer 102 causes the thread (or process, if application 106 is single-threaded) of application 106 from which the method was invoked to begin waiting. Instructions following the invocation instruction in the thread are not executed until the thread stops waiting. The thread continues to wait until a Smart Card is present in the specified Smart Card-accessing device. In response to determining that a Smart Card is present in the specified Smart Card-accessing device, server computer 102 causes the thread to stop waiting. Instructions following the invocation instruction in the thread are executed after the thread stops waiting.

In one embodiment, server computer 102 starts a timer in response to the invocation of the "waitForCardPresent" method. The timer expires when the specified amount of time has passed since the invocation. In response to detecting that the timer has expired, server computer 102 causes the thread to stop waiting, even if no Smart Card is present in the specified Smart Card-accessing device.

According to one embodiment, API methods 108 comprise a "waitForCardAbsent" method. The invocation of the "waitForCardAbsent" method specifies, as a parameter of the method, one of Smart Card-accessing devices 104A-N. In one embodiment, the invocation further specifies, as a parameter of the method, an amount of time.

In one embodiment, in response to detecting an invocation, by application 106, of the "waitForCardAbsent" method, server computer 102 causes the thread (or process, if application 106 is single-threaded) of application 106 from which the method was invoked to begin waiting. The thread continues to wait until no Smart Card is present in the specified Smart Card-accessing device. In response to determining that no Smart Card is present in the specified Smart Card-accessing device, server computer 102 causes the thread to stop waiting.

In one embodiment, server computer 102 starts a timer in response to the invocation of the "waitForCardAbsent" method. The timer expires when the specified amount of time has passed since the invocation. In response to detecting that the timer has expired, server computer 102 causes the thread to stop waiting, even if a Smart Card is present in the specified Smart Card-accessing device.

According to one embodiment, API methods 108 comprise a "waitForCardRemoved" method. The invocation of the "waitforCardRemoved" method specifies, as a parameter of the method, a Smart Card identifier. In one embodiment, the invocation further specifies, as a parameter of the method, an amount of time.

In one embodiment, in response to detecting an invocation, by application 106, of the "waitForCardRemoved" method, server computer 102 causes the thread (or process, if application 106 is single-threaded) of application 106 from which the method was invoked to begin waiting. The thread continues to wait until the specified Smart Card is not present in a particular Smart Card-accessing device. In response to determining that the specified Smart Card is not present in the particular Smart Card-accessing device, server computer 102 causes the thread to stop waiting.

In one embodiment, server computer 102 starts a timer in response to the invocation of the "waitForCardRemoved" method. The timer expires when the specified amount of time has passed since the invocation. In response to detecting that the timer has expired, server computer 102 causes the thread to stop waiting, even if the specified Smart Card is present in the particular Smart Card-accessing device.

Sample Operation

With the above information in mind, samples of operation of the system 100 in accordance with one embodiment of the present invention will now be described. In the following discussion, reference will be made to the system diagram of FIG. 1 and the flow diagrams of FIGS. 2-6.

Starting and Stopping an Event Listener

Figure 2:
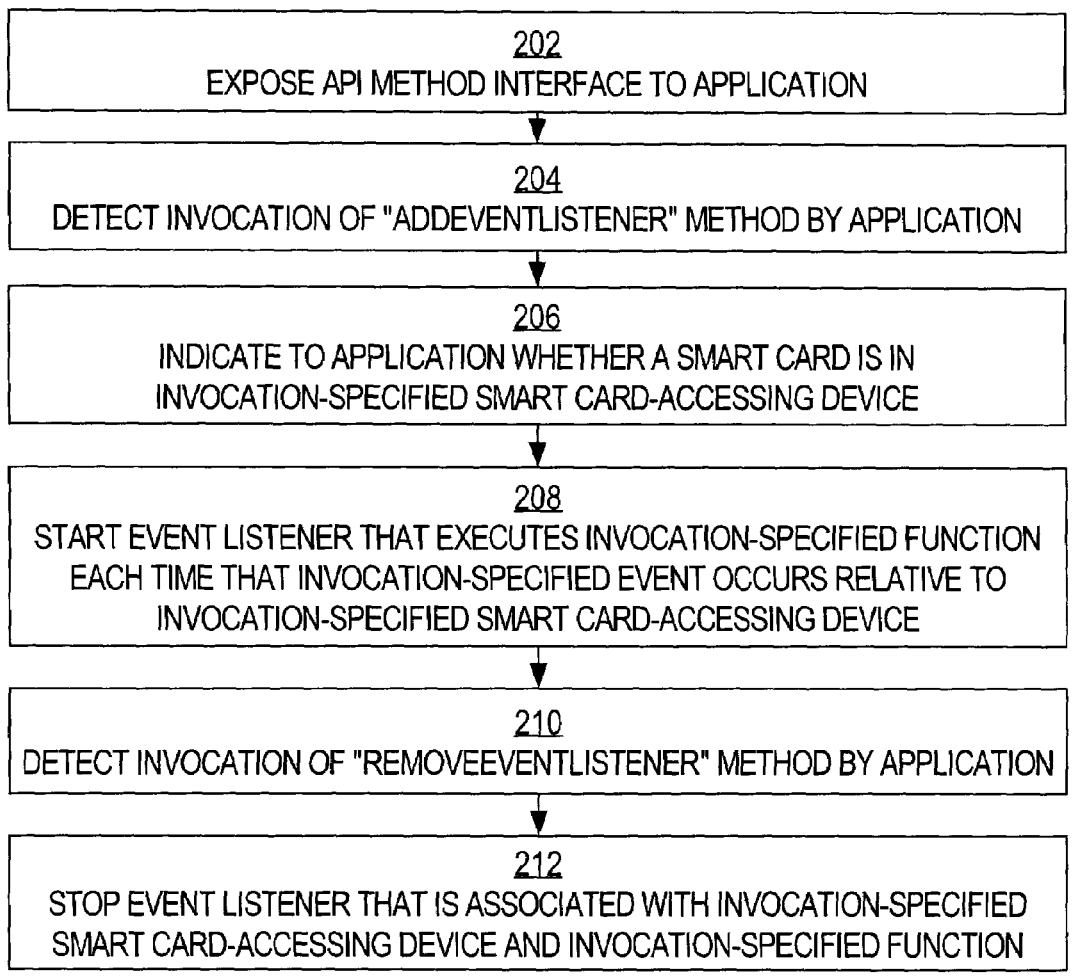
FIG. 2 is an operational flow diagram illustrating a technique for starting and stopping an event listener that listens for specified events relative to a specified Smart Card-accessing device, in accordance with one embodiment of the present invention.

FIG. 2 depicts an operational flow for starting and stopping an event listener that listens for specified events relative to a specified Smart Card-accessing device. An interface to API methods 108 is exposed (block 202) to application 106. An invocation of the "addEventListener" method by application 106 is detected (block 204). The invocation specifies, as parameters, one of Smart Card accessing devices 104A-N, a type of event, and a function. In response to the invocation of the "addEventListener" method, it is indicated (block 206), to application 106, whether a Smart Card is currently present in the specified Smart Card-accessing device. Also in response to the invocation of the "addEventListener" method, an event listener, which executes the specified function each time that the specified Smart Card-accessing device experiences an event of the specified type, is started (block 208).

Afterwards, an invocation of the "removeEventListener" method by application 106 is detected (block 210). The invocation specifies, as parameters, one of Smart Card-accessing devices 104A-N and a function. In response to the invocation of the "removeEventListener" method, an event listener that corresponds to the specified Smart Card-accessing device and the specified function is stopped (block 212).

For example, application 106 may invoke the "addEventListener" method with Smart Card-accessing device 104A, the "device reset" event type, and a first function as parameters. In response to detecting the invocation, server computer 102 indicates, to application 106, whether a Smart Card is currently present in Smart Card-accessing device 104A, and starts a first event listener that executes the first function each time that Smart Card-accessing device 104A receives a "reset" command.

Continuing the example, application 106 may then invoke the "addEventListener" method with Smart Card-accessing device 104A, the "card inserted" event type, and a second function as parameters, where the second function differs from the first function. In response to detecting the invocation, server computer 102 indicates, to application 106, whether a Smart Card is currently present in Smart Card-accessing device 104A, and starts a second event listener that executes the second function each time that a Smart Card is inserted into Smart Card-accessing device 104A.

Continuing the example, application 106 may then invoke the "addEventListener" method with Smart Card-accessing device 104B, the "device reset" event type, and the first function as parameters. In response to detecting the invocation, server computer 102 indicates, to application 106, whether a Smart Card is currently present in Smart Card-accessing device 104B, and starts a third event listener that executes the first function each time that Smart Card-accessing device 104B receives a "reset" command.

Continuing the example, application 106 may then invoke the "removeEventListener" method with Smart Card-accessing device 104A and the first function as parameters. In response to detecting the invocation, server computer 102 stops the first event listener, which corresponds to Smart Card-accessing device 104A and the first function. Because the second event listener corresponds to the second function rather than the first function, the second event listener is not stopped. Because the third event listener corresponds to Smart Card-accessing device 104B rather than Smart Card-accessing device 104A, the third event listener is not stopped. Thus, a specified event listener may be stopped while other event listeners continue.

Causing an Application to Begin Waiting and Stop Waiting

Figure 3:
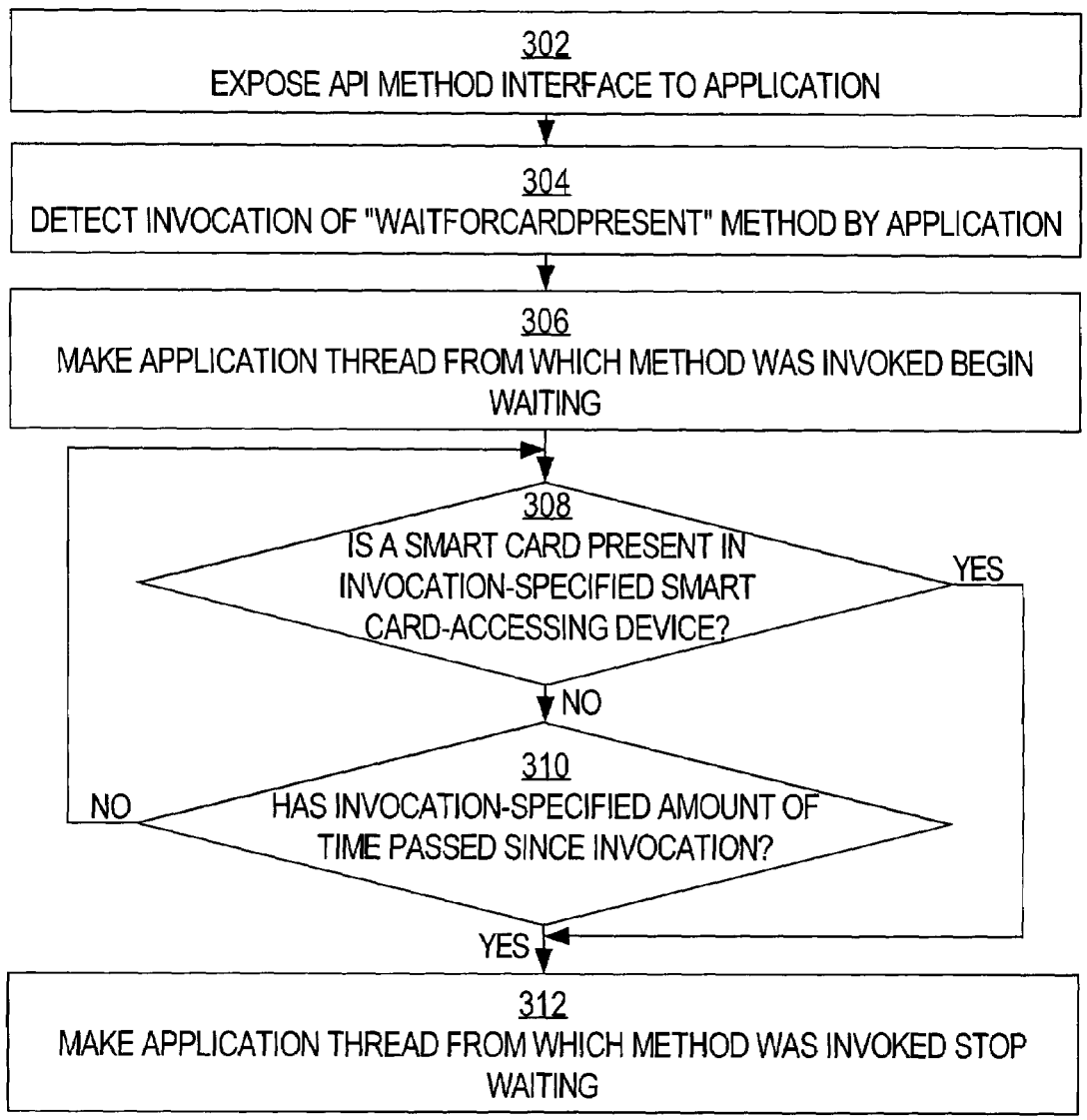
FIG. 3 is an operational flow diagram illustrating a technique for causing an application thread to begin waiting and stop waiting based on whether a Smart Card is currently present in a specified Smart Card-accessing device, in accordance with one embodiment of the present invention.

FIG. 3 depicts an operational flow for causing an application thread to begin waiting and stop waiting based on whether a Smart Card is currently present in a specified Smart Card-accessing device. An interface to API methods 108 is exposed (block 302) to application 106. An invocation of the "waitForCardPresent" method by application 106 is detected (block 304). The invocation specifies, as parameters, one of Smart Card accessing devices 104A-N and an amount of time. In response to the invocation of the "waitForCardPresent" method, the thread of application 106 from which the method was invoked is made (block 306) to begin waiting.

While the thread is waiting, it is determined (block 308) whether a Smart Card is present in the specified Smart Card-accessing device. If a Smart Card is present in the specified Smart Card-accessing device, then control passes to block 312. Otherwise, control passes to block 310.

If no Smart Card is present in the specified Smart Card-accessing device, then it is determined (block 310) whether the specified amount of time has passed since the invocation of the "waitForCardPresent" method. If the specified amount of time has passed, then control passes to block 312. Otherwise, control passes back to block 308 as the waiting thread continues to wait.

If the specified amount of time has passed, or if a Smart Card is currently present in the specified Smart Card-accessing device, then the waiting thread is made (block 312) to stop waiting. Instructions following the invocation instruction in the thread are executed after the thread stops waiting.

Figure 4:
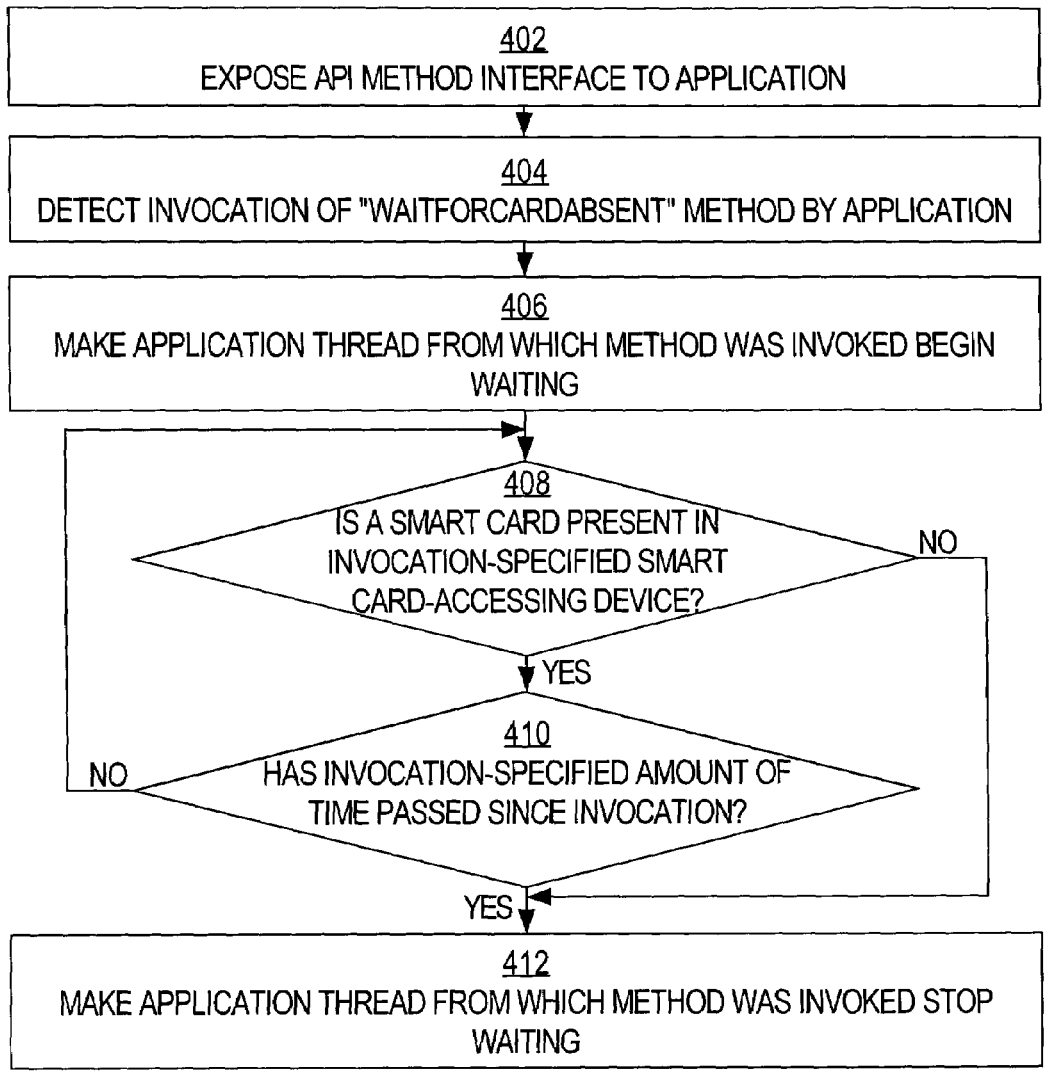
FIG. 4 is an operational flow diagram illustrating a technique for causing an application thread to begin waiting and stop waiting based on whether no Smart Card is currently present in a specified Smart Card-accessing device, in accordance with one embodiment of the present invention.

FIG. 4 depicts an operational flow for causing an application thread to begin waiting and stop waiting based on whether no Smart Card is currently present in a specified Smart Card-accessing device. An interface to API methods 108 is exposed (block 402) to application 106. An invocation of the "waitForCardAbsent" method by application 106 is detected (block 404). The invocation specifies, as parameters, one of Smart Card accessing devices 104A-N and an amount of time. In response to the invocation of the "waitForCard-Absent" method, the thread of application 106 from which the method was invoked is made (block 406) to begin waiting.

While the thread is waiting, it is determined (block 408) whether any Smart Card is present in the specified Smart Card-accessing device. If no Smart Card is present in the specified Smart Card-accessing device, then control passes to block 412. Otherwise, control passes to block 410.

If any Smart Card is present in the specified Smart Card-accessing device, then it is determined (block 410) whether the specified amount of time has passed since the invocation of the "waitForCardAbsent" method. If the specified amount of time has passed, then control passes to block 412. Otherwise, control passes back to block 408 as the waiting thread continues to wait.

If the specified amount of time has passed, or if no Smart Card is currently present in the specified Smart Card-accessing device, then the waiting thread is made (block 412) to stop waiting. Instructions following the invocation instruction in the thread are executed after the thread stops waiting.

Figure 5:
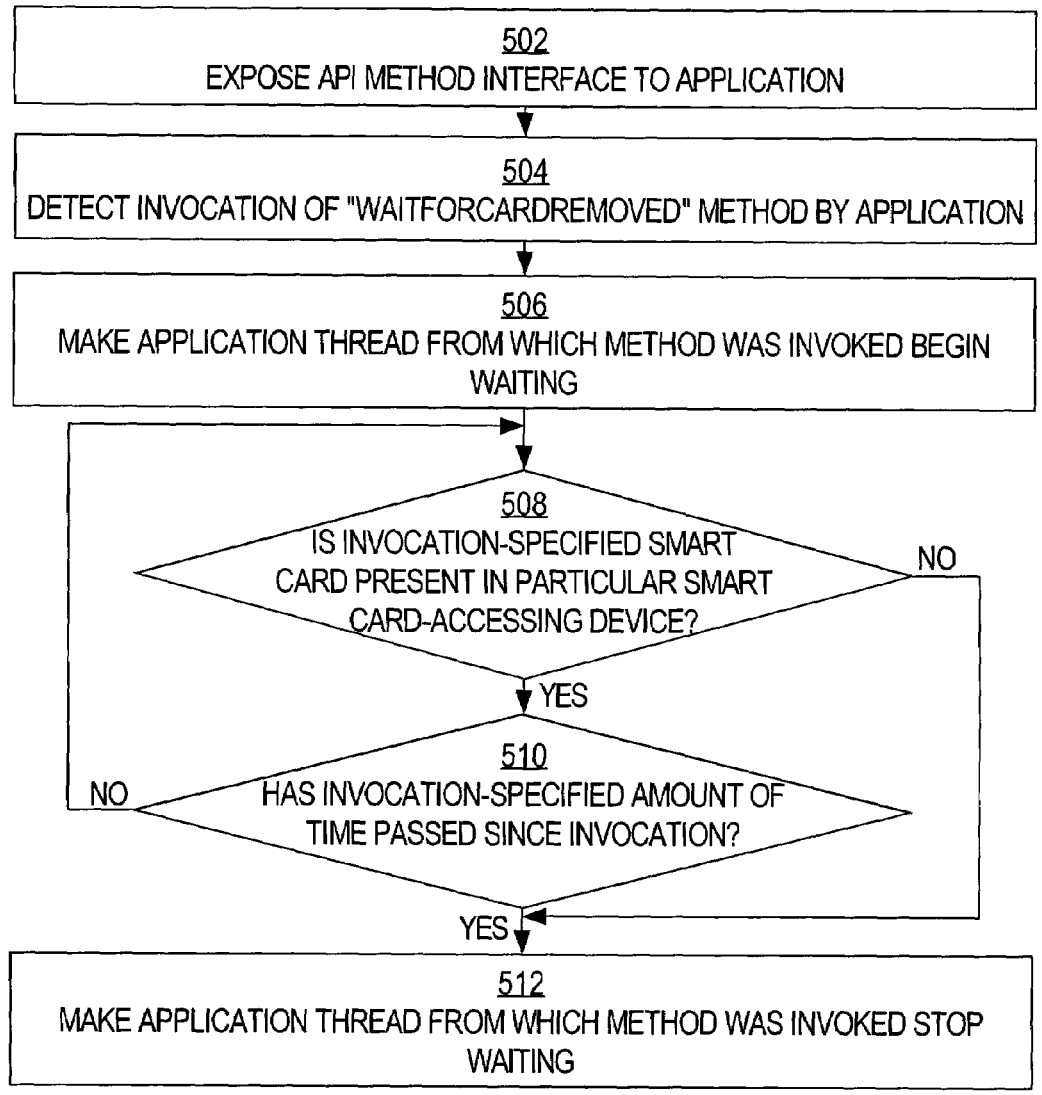
FIG. 5 is an operational flow diagram illustrating a technique for causing an application thread to begin waiting and stop waiting based on whether a specified Smart Card is currently present in any Smart Card-accessing device, in accordance with one embodiment of the present invention.

FIG. 5 depicts an operational flow for causing an application thread to begin waiting and stop waiting based on whether a specified Smart Card is currently present in any Smart Card-accessing device. An interface to API methods 108 is exposed (block 502) to application 106. An invocation of the "waitForCardRemoved" method by application 106 is detected (block 504). The invocation specifies, as parameters, a unique Smart Card identifier and an amount of time. In response to the invocation of the "waitForCardRemoved" method, the thread of application 106 from which the method was invoked is made (block 506) to begin waiting.

While the thread is waiting, it is determined (block 508) whether the specified Smart Card is present any of Smart Card-accessing devices 104A-N. If the specified Smart Card is not present in any of Smart Card-accessing devices 104A-N, then control passes to block 512. Otherwise, control passes to block 510.

If the specified Smart Card is present in any of Smart Card-accessing devices 104A-104N, then it is determined (block 510) whether the specified amount of time has passed since the invocation of the "waitForCardRemoved" method. If the specified amount of time has passed, then control passes to block 512. Otherwise, control passes back to block 508 as the waiting thread continues to wait.

If the specified amount of time has passed, or if the specified Smart Card is not currently present in any of Smart Card-accessing devices 104A-N, then the waiting thread is made (block 512) to stop waiting. Instructions following the invocation instruction in the thread are executed after the thread stops waiting.

Controlling Access to Smart Card-Accessing Devices

Figure 6:
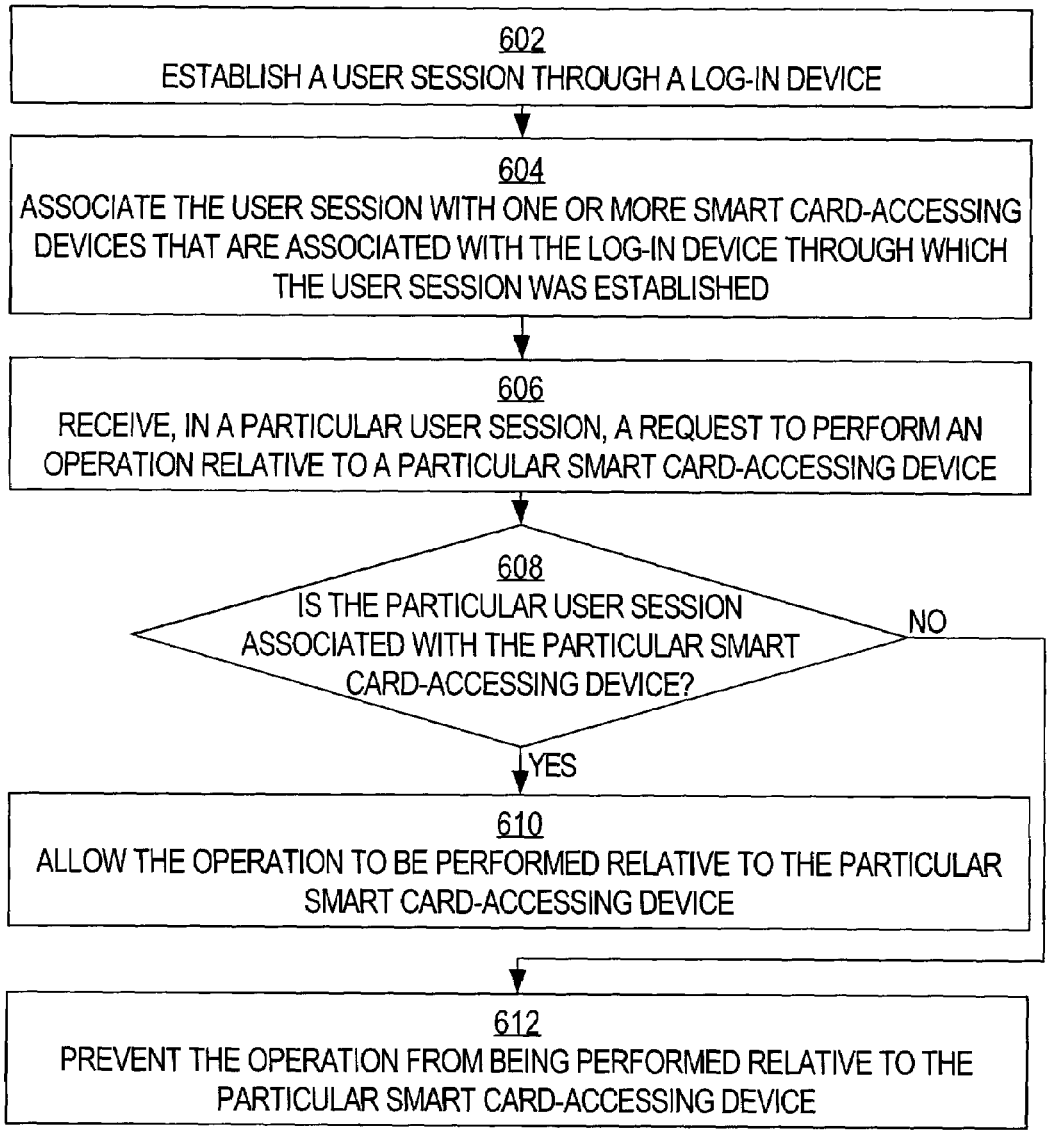
FIG. 6 is an operational flow diagram illustrating a technique for controlling access to Smart Card-accessing devices, in accordance with one embodiment of the present invention.

FIG. 6 depicts an operational flow for controlling access to Smart Card-accessing devices. A user session is established (block 602) with server computer 102 through a log-in device that is associated with one or more of Smart Card-accessing devices 104A-N. Based on an existing association between the log-in device and one or more Smart Card-accessing devices, the user session is associated (block 604) with the one or more Smart Card-accessing devices that are associated with the log-in device.

In a user session, server computer 102 receives (block 606) a request to perform an operation relative to one of Smart Card-accessing devices 104A-N. In response to receiving the request, a mechanism executing on server computer 102 determines (block 608) whether the user session in which the request was received is associated with the Smart Card-accessing device specified by the request. If the user session is associated with the specified Smart Card-accessing device, then control passes to block 610. Otherwise, control passes to block 612.

If the user session is associated with the specified Smart Card-accessing device, then the mechanism executing on server computer 102 allows the operation to be performed relative to the specified Smart Card-accessing device.

Otherwise, if the user session is not associated with the specified Smart Card-accessing device, then the mechanism executing on server computer 102 prevents the operation from being performed relative to the specified Smart Card-accessing device.

For example, a first user session may be established through a log-in device that is associated with Smart Card-accessing device 104A. Consequently, the first user session is associated with Smart Card-accessing device 104A. A second user session may be established through a log-in device that is associated with Smart Card-accessing device 104B. Consequently, the second user session is associated with Smart Card-accessing device 104B. If a request to read information from or write information to the Smart Card in Smart Card-accessing device 104A is received through the second user session, then the read/write operation is not permitted. However, if a request to read information from or write information to the Smart Card in Smart Card-accessing device 104A is received through the first user session, then the read/write operation is allowed.

Hardware Overview

Figure 7:
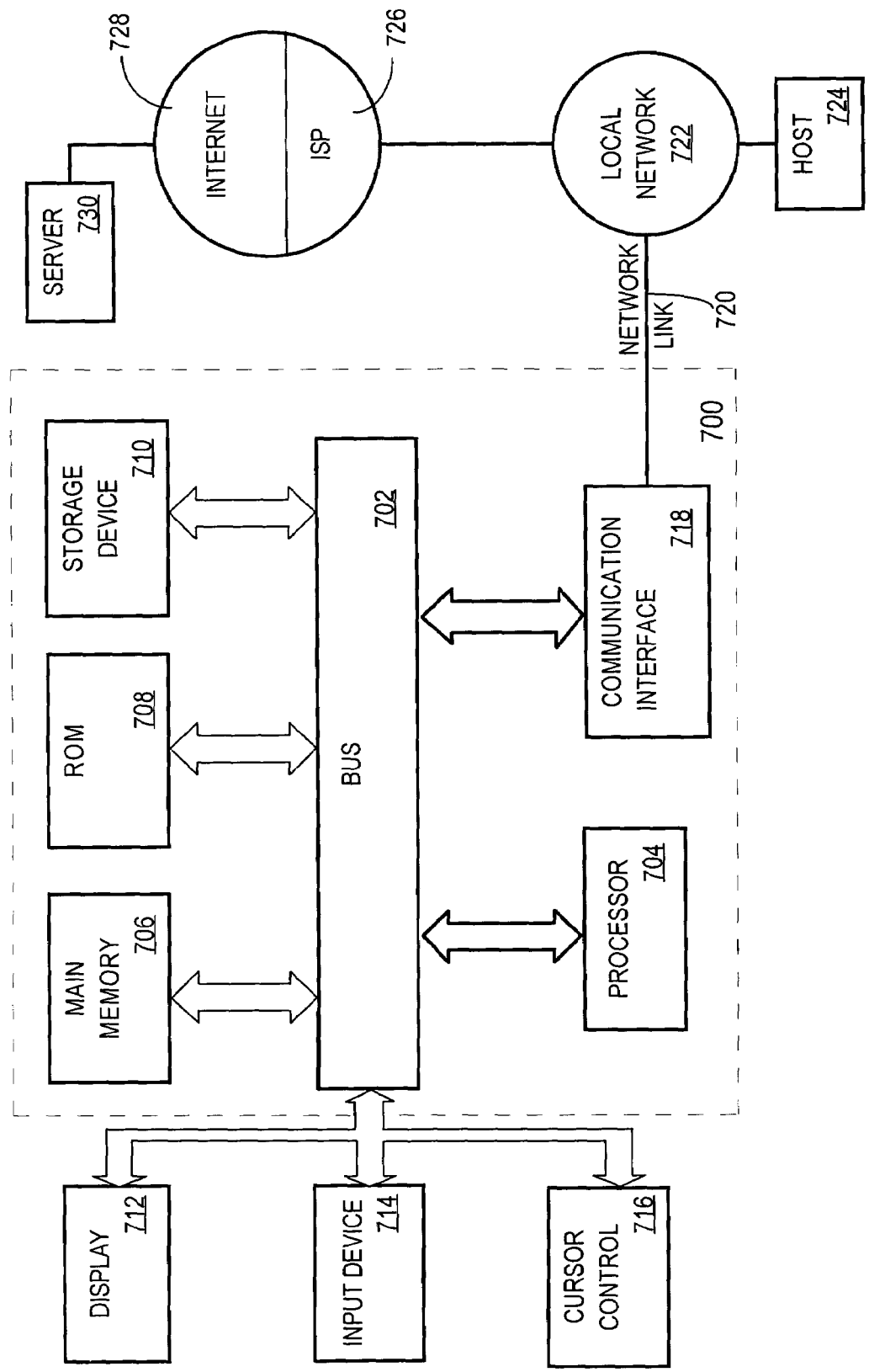
FIG. 7 is a hardware block diagram of a sample computer system, which may be used to execute one or more components of an embodiment of the present invention.

In one embodiment, the various components shown in FIG. 1 (e.g. application 106, API methods 108, and operating system kernel 110) are implemented as sets of instructions executable by one or more processors. These components may be implemented as part of an object oriented programming system, including but not limited to the JAVA™ programming system manufactured by Sun Microsystems, Inc. FIG. 7 shows a hardware block diagram of a computer system 700 which may be used to execute these components. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 may also be further used to store temporary variables or other intermediate information during execution of instructions by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

According to one embodiment, the functionality of the present invention is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or electromagnetic waves, such as those generated during radio-wave, infra-red, and optical data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage device 710, or other non-volatile storage for later execution. In this manner, computer system 700 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims.

What is claimed is:

1. A computer implemented method, comprising:
   exposing, to an application, an interface that comprises a first method;
   detecting a first invocation of the first method by the application, wherein the first invocation specifies a first Smart Card-accessing device, a first type of event, and a first function;
   in response to detecting the first invocation of the first method, performing steps comprising:
      determining whether the first type of event is a type of event that occurs when a reset command is sent to a Smart Card-accessing device; and
      if the first type of event is a type of event that occurs when a reset command is sent to a Smart Card-accessing device, then starting a first mechanism that executes the first function each time that the first Smart Card-accessing device receives a reset command;
   detecting a second invocation of the first method by the application, wherein the second invocation specifies a second type of event, a second function, and the first Smart Card-accessing device; and
   in response to detecting the second invocation of the first method, starting a second mechanism that executes the second function each time that an event of the second type of event occurs relative to the first Smart Card-accessing device, wherein the second mechanism is separate from the first mechanism.

2. The method of claim 1, further comprising:
   detecting a second invocation of the first method by the application, wherein the second invocation specifies the first type of event, a second function, and a second Smart Card-accessing device that is separate from the first Smart Card-accessing device; and
   in response to detecting the second invocation of the first method, starting a second mechanism that executes the second function each time that the second Smart Card-accessing device receives a reset command.

3. The method of claim 2, wherein the second function differs from the first function.

4. The method of claim 1, wherein the interface comprises a second method, and further comprising:
   detecting an invocation of the second method by the application, wherein the invocation of the second method specifies the first Smart Card-accessing device; and
   in response to detecting the invocation of the second method, stopping the first mechanism.

5. The method of claim 1, wherein the interface comprises a second method, and further comprising:
   detecting an invocation of the second method by the application, wherein the invocation of the second method specifies the first function; and
   in response to detecting the invocation of the second method, stopping the first mechanism without stopping the second mechanism.

6. A computer implemented method, comprising:
   exposing, to an application, an interface that comprises a first method;
   detecting a first invocation of the first method by the application, wherein the first invocation specifies a first Smart Card-accessing device, a first type of event, and a first function; and
   in response to detecting the first invocation of the first method, performing steps comprising:
      indicating, to the application, whether a Smart Card is currently present in the first Smart Card-accessing device; and
      starting a first mechanism that executes the first function each time that an event of the first type of event occurs relative to the first Smart Card-accessing device;
   detecting a second invocation of the first method by the application, wherein the second invocation specifies a second type of event, a second function, and the first Smart Card-accessing device;
   in response to detecting the second invocation of the first method, performing steps comprising:
      indicating, to the application, whether a Smart Card is currently present in the first Smart Card-accessing device; and
   starting a second mechanism that executes the second function each time that an event of the second type of event occurs relative to the first Smart Card-accessing device, wherein the second mechanism is separate from the first mechanism.

7. The method of claim 6, further comprising:
   detecting a second invocation of the first method by the application, wherein the second invocation specifies the first type of event, a second function, and a second Smart Card-accessing device that is separate from the first Smart Card-accessing device; and
   in response to detecting the second invocation of the first method, performing steps comprising:
      indicating, to the application, whether a Smart Card is currently present in the second Smart Card-accessing device; and
      starting a first mechanism that executes the first function each time that an event of the first type of event occurs relative to the second Smart Card-accessing device.

8. The method of claim 7, wherein the second function differs from the first function.

9. The method of claim 6, wherein the interface comprises a second method, and further comprising:
   detecting an invocation of the second method by the application, wherein the invocation of the second method specifies the first Smart Card-accessing device; and
   in response to detecting the invocation of the second method, stopping the first mechanism.

10. The method of claim 6, wherein the interface comprises a second method, and further comprising:
    detecting an invocation of the second method by the application, wherein the invocation of the second method specifies the first function; and
    in response to detecting the invocation of the second method, stopping the first mechanism without stopping the second mechanism.

11. The method of claim 6, wherein the first type of event is a type of event that occurs when a Smart Card is inserted into a Smart Card-accessing device.

12. The method of claim 6, wherein the first type of event is a type of event that occurs when a Smart Card is removed from a Smart Card-accessing device.

13. A computer implemented method, comprising:
    exposing, to an application, an interface that comprises a first method;
    detecting a first invocation of the first method by the application, wherein the first invocation specifies a first Smart Card-accessing device, a first type of event, and a first function;
    in response to detecting the first invocation of the first method, performing steps comprising:
       determining whether the first type of event is a type of event that occurs when a command, which indicates that a Smart Card-accessing device is to be closed, is sent to a Smart Card-accessing device; and
       if the first type of event is a type of event that occurs when a command, which indicates that a Smart Card-accessing device is to be closed, is sent to a Smart Card-accessing device, then starting a first mechanism that executes the first function in response to the first Smart Card-accessing device receiving a command that indicates that a Smart Card-accessing device is to be closed;
    detecting a second invocation of the first method by the application, wherein the second invocation specifies a second type of event, a second function, and the first Smart Card-accessing device; and
    in response to detecting the second invocation of the first method, starting a second mechanism that executes the second function each time that an event of the second type of event occurs relative to the first Smart Card-accessing device, wherein the second mechanism is separate from the first mechanism.

14. The method of claim 13, further comprising:
    detecting a second invocation of the first method by the application, wherein the second invocation specifies the first type of event, a second function, and a second Smart Card-accessing device that is separate from the first Smart Card-accessing device; and
    in response to detecting the second invocation of the first method, starting a second mechanism that executes the second function in response to the second Smart Card-accessing device receiving a command that indicates that a Smart Card-accessing device is to be closed.

15. The method of claim 14, wherein the second function differs from the first function.

16. The method of claim 13, wherein the interface comprises a second method, and further comprising:

detecting an invocation of the second method by the application, wherein the invocation of the second method specifies the first Smart Card-accessing device; and in response to detecting the invocation of the second method, stopping the first mechanism.

17. The method of claim 13, wherein the interface comprises a second method, and further comprising:

detecting an invocation of the second method by the application, wherein the invocation of the second method specifies the first function; and in response to detecting the invocation of the second method, stopping the first mechanism without stopping the second mechanism.

18. A computer implemented method, comprising:

exposing, to an application, an interface that comprises a first method;

detecting a first invocation of the first method by the application, wherein the first invocation specifies a first Smart Card-accessing device, a first type of event, and a first function;

in response to detecting the first invocation of the first method, performing steps comprising:

determining whether the first type of event is a type of event that occurs when loss of communication with a Smart Card-accessing device is detected; and if the first type of event is a type of event that occurs when loss of communication with a Smart Card-accessing device is detected, then starting a first mechanism that executes the first function in response to loss of communication with the first Smart Card-accessing device being detected;

detecting a second invocation of the first method by the application, wherein the second invocation specifies a second type of event, a second function, and the first Smart Card-accessing device; and in response to detecting the second invocation of the first method, starting a second mechanism that executes the second function each time that an event of the second type of event occurs relative to the first Smart Card-accessing device, wherein the second mechanism is separate from the first mechanism.

19. The method of claim 18, further comprising:

detecting a second invocation of the first method by the application, wherein the second invocation specifies the first type of event, a second function, and a second Smart Card-accessing device that is separate from the first Smart Card-accessing device; and in response to detecting the second invocation of the first method, starting a second mechanism that executes the second function in response to loss of communication with the first Smart Card-accessing device being detected.

20. The method of claim 19, wherein the second function differs from the first function.

21. The method of claim 18, wherein the interface comprises a second method, and further comprising:

detecting an invocation of the second method by the application, wherein the invocation of the second method specifies the first Smart Card-accessing device; and in response to detecting the invocation of the second method, stopping the first mechanism.

22. The method of claim 18, wherein the interface comprises a second method, and further comprising:

detecting an invocation of the second method by the application, wherein the invocation of the second method specifies the first function; and in response to detecting the invocation of the second method, stopping the first mechanism without stopping the second mechanism.

* * * * *